United States Patent [19]
Kruse

[11] 3,750,509
[45] Aug. 7, 1973

[54] PROFILE STEEL CUTTER

[75] Inventor: Erwin Kruse, Gevelsberg, Germany

[73] Assignee: Werner Peddinghaus,
Sprockhovel-Hassling-Rausen,
Germany

[22] Filed: May 17, 1972

[21] Appl. No.: 253,980

[52] U.S. Cl. .................................. 83/198, 83/552
[51] Int. Cl. ............................................ B23d 23/00
[58] Field of Search ...................... 83/198, 552, 580

[56] References Cited
UNITED STATES PATENTS

| | | | |
|---|---|---|---|
| 900,147 | 10/1908 | Clipfel | 83/552 |
| 994,755 | 6/1911 | Kraut | 83/552 X |
| 3,391,591 | 7/1968 | Funke | 83/198 X |

*Primary Examiner*—J. M. Meister
*Attorney*—Walter Becker

[57] ABSTRACT

A tool device in which an indexable disc has tool plates in circumferentially spaced positions. A tool actuator is moveable radially to move a tool plate aligned therewith radially inwardly of the disc for a cutting operation. The plate is adapted to support cutting tools to cut a work piece against which the cutting tools are moved by the radially inward movement of the respective tool plate. When a tool plate carried by the disc is rotated away from the actuator, the tool plate can be removed from the disc, while the actuator actuates a different one of the tool plates.

13 Claims, 10 Drawing Figures

Patented Aug. 7, 1973 3,750,509

Patented Aug. 7, 1973
3,750,509
4 Sheets-Sheet 2
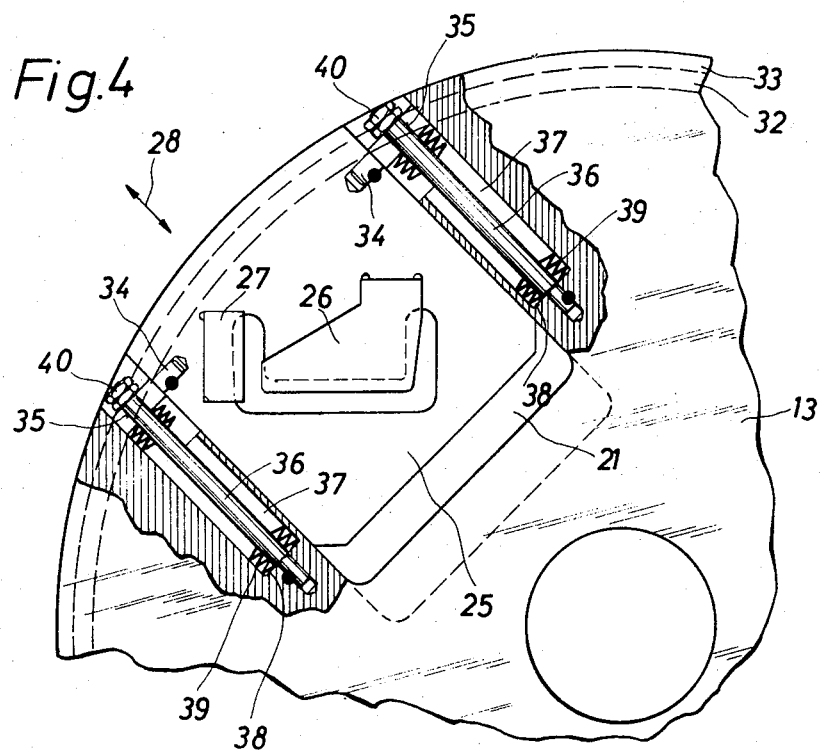
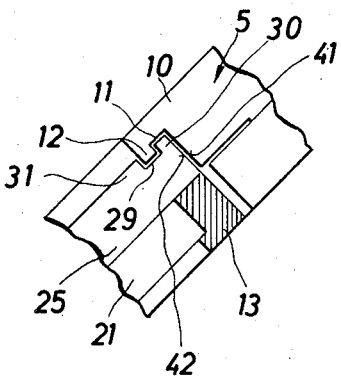
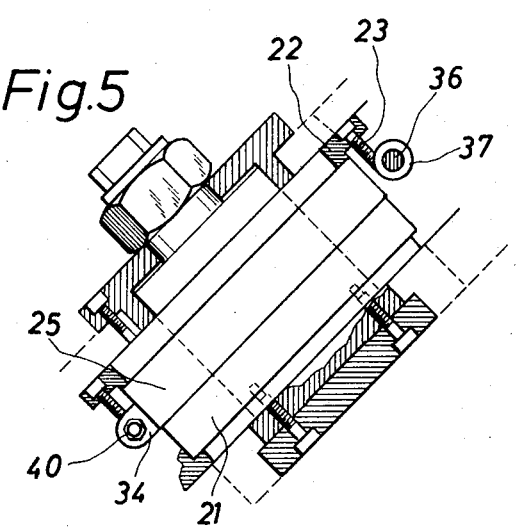

Patented Aug. 7, 1973  3,750,509

PROFILE STEEL CUTTER

The present invention relates to a profile steel cutter or shears with a rectilinearly movable cutter carriage and with a movable and stationary blade plate.

For cutting different profiles, it is known in connection with profile steel cutters of the above mentioned type, to exchange the stationary as well as the movable blade arranged on the cutter carriage for other blades.

It is an object of the present invention with a profile steel cutter of the above mentioned type to be able to effect the exchange of the movable and stationary cutting blades or plates in a minimum of time without having to stop the cutter.

It is another object of this invention to provide a profile steel cutter as set forth in the preceding paragraph, which will make it possible to effect the exchange of the movable and of the stationary cutting blade or cutting plate without the operator having to exert great force.

Still another object of this invention consists in the provision of a profile cutter as outlined above which will be relatively inexpensive and simple and will permit cutting the thickest commercially available profile steels along a straight as well as along a miter cut.

These and other objects and advantages of the invention will appear more clearly from the following specification in connection with the accompanying drawings, in which:

FIG. 4 illustrates on a larger scale than that of FIGS. 1 to 3 a cutout of the turret disc.

FIG. 5 shows partly in section and partly in view the revolving or turret disc as seen in radial direction.

FIG. 6 shows a detail of the turret disc.

Figure 9:
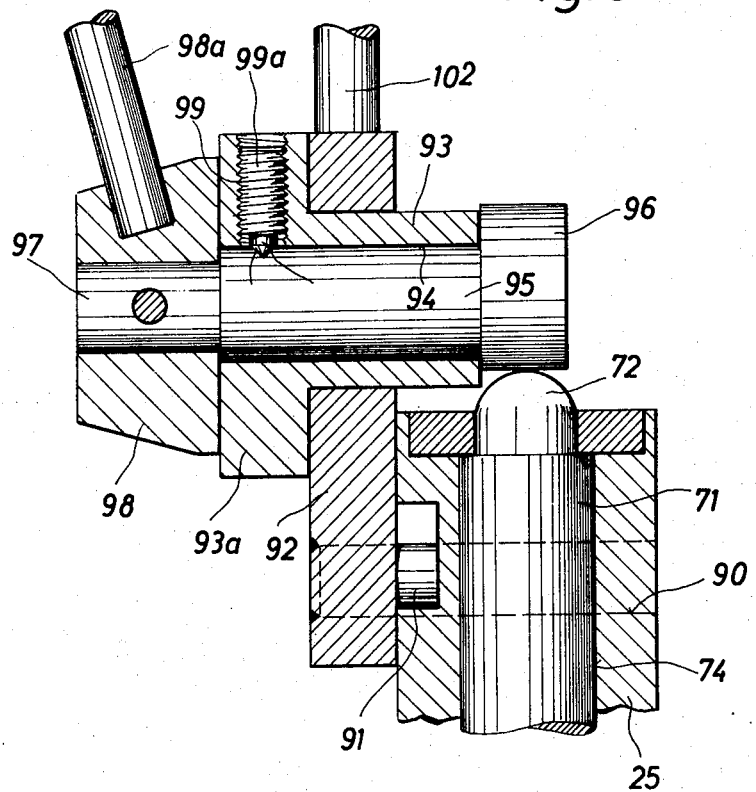
Figure 10:
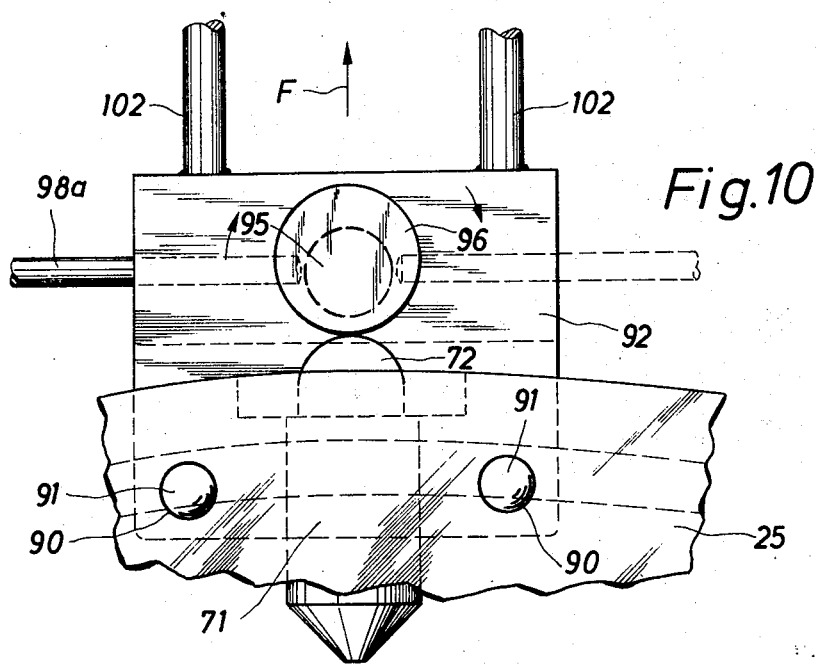

FIGS. 9 and 10 respectively illustrate in section and in view a supporting and release plate detachably connectable to the movable cutting blade or plate.

The profile steel cutter according to the present invention which is provided with a rectilinearly movable cutter carriage and a movable and a stationary cutter plate is characterized primarily in that a plurality of stationary cutter plates is provided having associated therewith a plurality of movable cutter plates, the stationary and movable cutter plates being mounted along a circle and in radial direction on a vertical revolving disc known per se, while the tool carriage is located at the level of the movable cutter plates of the arrestable revolving disc, the movable cutter plates being adapted to be held by an abutment in their starting position.

In connection with machine tools, revolving discs for tools are known. Thus, for instance, with horizontal drilling and milling machines, revolving discs as well as revolving chains have become known as tool magazines. Moreover, cutters for simple rod material are known in which on a horizontal disc there is arranged a plurality of different counter tools, for instance, a counter blade of a cutter. Cutters of this type, however, do not permit the cutting of thick profile iron bars or the like nor is it possible with such known cutters to carry out miter cuts.

The invention, therefore, is based on the principle, while taking advantage of the employment of a revolving disc, so to arrange the disc and the plates that the respective cutter plate occupying its cutting position is moved on the rotatable revolving disc by the cutter carriage which does not rotate together with the revolving disc while, however, a turning of the revolving disc into the respective desired position is possible. Expressed differently, the respective cutter plate occupying its cutting position and pertaining to a cutter set is in its working position as well as in its starting position held by an abutment against the revolving disc and is subjected to a relative movement, i.e., the cutting movement, by the stationarily guided cutter carriage.

According to one embodiment of the invention, the movable cutter plates of the revolving disc are acted upon by springs which act in the direction of movement of the plates. By means of these springs, the movable cutter plates are able on the revolving disc to carry out a movement relative with regard to the center of the disc but by means of the abutment and the springs are held in their starting position. To this end, the movable cutter plates are provided with lateral studs which in the starting position of the plates engage confining abutments. These last mentioned abutments may be adjustable in the direction of movement of the movable cutter plate and may be detachable so that the movable cutter plates can easily be withdrawn from the revolving disc and can be exchanged for other plates. Furthermore, with this embodiment, guiding bars for the plate studs are arranged in the revolving disc adjacent the guiding means for the movable cutter plates. These plate studs carry the confining abutments and springs and guide the same.

Particularly advantageous is a design according to the invention in which the revolving disc and the movable cutter plates in their starting position form a common uninterrupted annular groove which is engaged by a corresponding extension of the cutter carriage. In this instance, the groove is provided in the margin of the revolving disc and the outer rim of the movable cutter plates, and the margin or rim of the cutter carriage which is adjacent to the revolving disc is provided with a collar engaging the groove, the collar being curved in conformity with the curvature of the groove. In this way the revolving disc with the movable cutter plates, preferably four or six cutter plates are provided, can be turned at random while the collar of the cutter carriage extends into the groove of the rotating revolving disc and of the movable cutter plates.

When the revolving disc is at a standstill, the cutter carriage will be located at the level of the respectively desired movable cutter plate and will press the latter during the movement of the cutter carriage into the cutting position. When the cutter carriage returns to its starting position, the movable cutter plate will, in view of the engagement of the cutter plate groove by the carriage collar, move to its starting position. This action will be aided by the springs on the side of the movable cutter plate. When this action is completed, the groove of the cutter plate returned to its starting position will again be located at the level of the annular groove of the revolving disc so that the latter can again be turned while, as mentioned above, the collar of the cutter carriage slides in the groove.

According to a further development of the invention, the abutment for holding the movable cutter plates in their starting position is formed by an index bolt which by means of a stud is adjustable in one of the cutter plates in a direction perpendicular to the direction of movement of the movable cutter plate. The index bolt is adapted resiliently to engage a recess of the respective other cutter plate or of the cutter frame while the stud is actuated during the rotation of the revolving disc by the lower rim of the cutter carriage. Preferably, the stud and the index bolts are arranged in the movable cutter plate while the index bolt is non-rotatable but longitudinally adjustable.

In this way the lateral springs of the movable cutter plate according to the above mentioned embodiment become superfluous so that, on one hand, the disassembly and assembly of the movable cutter plates will still be further simplified while, on the other hand, the movable cutter plate will be guided continuously over its entire lateral height. The installation of the movable cutter plate in the revolving disc is rather simple inasmuch as this movable plate need be inserted only into its guiding means while the index bolt will automatically engage and lock in the recess of the other cutter plate or of the cutter frame. In order to withdraw the movable cutter plate from the revolving disc, it is merely necessary to depress the stud so that the index bolt moves out of the cutter frame. To this end, a corresponding device may be detachably connected to the movable cutter plate which device facilitates the removal of the movable cutter plate from the revolving disc and permits a pressing of the stud.

According to a still further development of the invention, the index bolt is provided with an inclined surface corresponding to an inclined surface on the stud.

At least one lateral edge at the lower rim of the cutter carriage is provided with a lifting flank or a straight lifting member for the head of the stud which protrudes beyond the outer rim of the movable cutter plate. By means of this lifting flank or straight member, the stud is pressed inwardly so that the two corresponding inclined surfaces of the stud and of the index bolt press the index bolt out of the recess of the other cutter plate or of the cutter frame. When the revolving disc after completed cut and when a tool exchange becomes necessary has been turned, a pressure spring arranged in the longitudinal direction of the index bolt presses the index bolt again into the recess of the other cutter plate or of the cutter frame whereas the stud, in view of the corresponding inclined surfaces, is again moved outwardly to its starting position in which it is held, for instance, against an abutment.

According to a further development of the invention, the movable cutter plate is provided with bores or pins by means of which one supporting or release plate is connectable to the movable cutter plate while the cutter plate is equipped with a lever, eccentric or the like for depressing the stud of the index bolt.

Referring now to the drawings in detail, the cutter stand 1 is formed by two plates 2, 2a which in a manner known per se are held in spaced relationship to each other. The upper side of stand 1 supports the drive motor 3 by means of which the drive or flywheel 4 is driven. Wheel 4 is adapted to adjust the cutter carriage 5 which is movable at an angle of 45° with regard to the horizontal plane. Carriage 5 is adapted to slide in guiding means 6 and by means of an eccentric 7 is movable in the direction of the double arrow 8.

The lower end of carriage 5 has an extension 9 the lower rim 10 of which is concavely curved in the direction toward the double arrow 8. This curved rim has a recess 11 and a collar 12 which are likewise concavely curved.

In the direction of movement of the carriage 5, between the two plates 2, 2a, there is a revolving disc 13 mounted on a shaft 14. This revolving disc 13 has bores 15 arranged along a circle. The plates 2, 2a are provided with bores 16, 17 corresponding to the bores 15 so that a pivot 18 can be passed through these bores 15 to 17. In this way, the revolving disc 13 may be stopped and held in definite positions relative to the plates 2, 2a. In order to change the position of the revolving disc 13, it is merely necessary to pull out the pivot 18 from the bores 15 – 17 whereupon the revolving disc 13 is rotated into its new desired position and is then again in this position by means of the pivot or pin 18 held against displacement.

Figure 3:
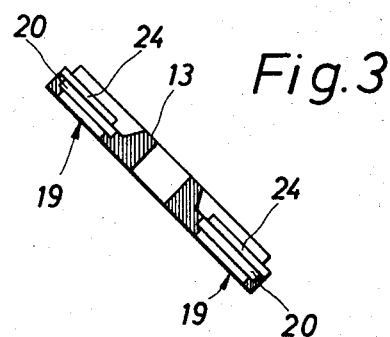
FIG. 3 is a section taken along the line III — III of FIG. 1.

The revolving disc 13 is in the vicinity of its rim provided with circular recesses 19 (FIG. 3) into which at 20 there are insertable the fixed or stationary cutting plates 21 (FIG. 5) which plates or blades are held in their respective position by clamping plates 22 and screws 23.

The movable cutting plate 25 is inserted into and guided by the wider part 24 of each recess 19 which latter is open toward the outside, which means toward the rim of the revolving disc 13. Cutter plate 25 is so inserted and guided in the wider part 24 that the cutter plate is able together with the blades 26, 27 to carry out movements in the direction of the double arrow 28 (FIG. 4). Each of the movable cutter plates 25 has its rim provided with a curved groove 29 adapted to be engaged by the collar 12 of the extension 9 of carriage 5. Groove 29 is confined by a likewise curved extension 30 and the protruding part 31 of the cutter plate.

The rim of the revolving disc 13 has the same cross section as the outer rim of each cutter plate, namely an annular groove 32 which is interrupted at the level of the cutter plate 25, and an outwardly protruding likewise interrupted rib-shaped extension 33. In this way the revolving disc 13 is adapted, after disengagement of the pin 18, to turn at random about its pivot or shaft 14 in either direction of movement while the curved rim 10 of the extension 9 of carriae 5 has its collar 12 extend into the annular groove 29, 32 of the cutter plate 25 or revolving disc 13.

Figure 1:
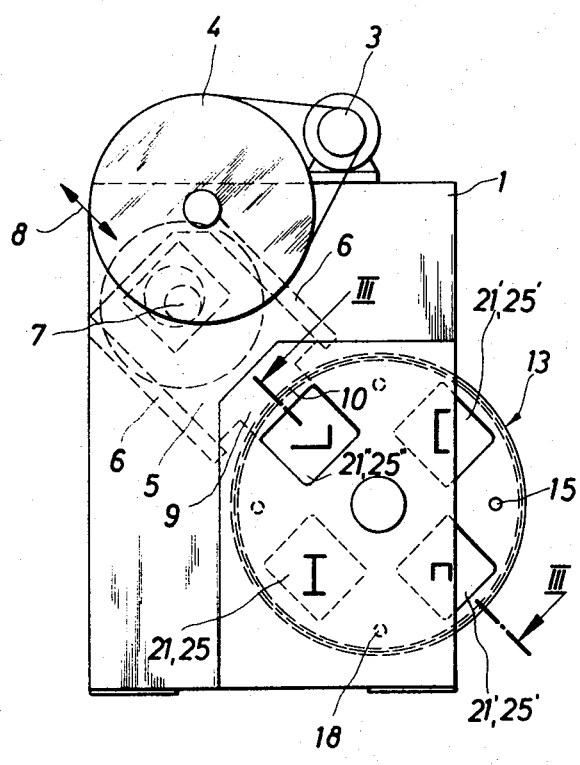
FIG. 1 is a front view of a profile cutter according to the invention.
Figure 2:
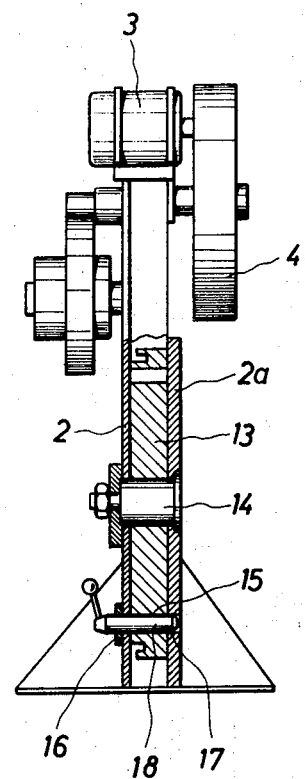
FIG. 2 shows the cutter of FIG. 1 partly in side view and partly in section.

Each cutter plate has two lateral pivots 34 which are secured against rotation. Through the bores 35 of the pivots 34 there extends a guiding bar 36 each which is connected to the bottom of a bore 37. Between the pivot 34 and the bottom 38 of bore 37 there is provided a spring 39 which is received by the bore and guided by the bar 36. The upper end of the guiding bar 36 carries nuts 40 forming a confining abutment for the starting position of the cutter plate 25. The screws 40 are disengageable so that the movable cutter plate together with the pivot 34 can be removed from the revolving disc 13 in radial direction when the cutter plate is located preferably in a fixed position facing away from the cutter carriage. Thus, for instance, the movable cutter plate 25 and the stationary or fixed cutter plate 21 may in their positions 21' and 25' in FIG. 1 be removed from the revolving disc 13 when operations have to be carried out by means of the cutter plates 21'' and 25''. Thus, during a cutting operation, the non-used cutter plate may be exchanged. With heretofore known machines, it was necessary, for purposes of exchanging the blades, to turn off the entire machine including the motor in order to avoid accidents.

Springs 39 aid in the returning of the movable cutter plate to its starting position and hold the same fixed in the starting position while the pivots 34 engage the nuts 40 so that a closed ring nut is formed of the nuts 29, 32. The pulling back of the movable cutter plate 25 is effected by the cutter carriage 5 inasmuch as its collar 12 engages the groove 29 of the movable cutter plate 25 and the latter will be carried along with the upward movement of the carriage. The cutting pressure, on the other hand, will during the downward movement of the carriage be exerted by the rim 41 of the carriage onto the edge 42 of the blade plate.

According to the embodiment of FIGS. 7 – 10, the movable cutter plate 25 may be secured in its starting position by an abutment which, however, is to be relieved for the cutting operation. To this end, the movable cutter plate 25 is in the center of its outer rim provided with a radial bore 70 which receives a pivot 27 having an arched head 72 and a conical tip 73.

Transverse to the longitudinal axis of the pivot 71 and thereby to the plane of the movable cutter plate 25 there is provided a round bore 74 which has its lower section provided with a groove 74 into which extends one portion of a key 76. The other portion of the key 76 extends into an index bolt 77 which by means of the key 76 is non-rotatable in the bore 74 but is longitudinally displaceable therein.

That side of the index bolt 77 which faces toward the pivot 71 has a recess 78 corresponding to the conical tip 73 of pivot 71 so that the conical pivot tip 73 and the recess 78 form corresponding inclined surfaces 79, 80.

The index bolt 77 is biased by a spring 81 which rests against a part 82 which is connected to the movable cutter plate 25. Spring 81 urges the index bolt to move toward the right with regard to FIG. 7 and has the tendency to press pivot 71 upwardly. The shoulder 83 of pivot 71 is adapted to engage a short strip 84 which strip is connected to the movable cutter plate 85 by screws.

The secondary cutter plate 21 is at the level of the index bolt 77 provided with a recess 85 which corresponds to the cross section of the index bolt.

The extension of the movable carriage 5, at least at the one lateral rim, is provided with an inclined surface 86 which is so arranged that when rotating the revolving disc 13 in the direction of the arrow L of FIG. 5, the head 72 of the pivot 71 moves against this inclined surface 86, and the pivot 21 is pressed radially inwardly and downwardly (FIG. 7) so that the index bolt 77 is against the thrust of spring 74 pressed outwardly (FIG. 7, toward the left) and thus is lifted out of the recess 85 of the stationary blade. As long as the pivot 71 is radially pressed inwardly by the rim 87 of the extension 9 of carriage 5, the movable cutter plate 25 will be disengaged from the stationary cutter plate 21. When the pivot 71 after rotation of the revolving disc 13 leaves the region of the rim 87 of the carriage extension 9, the spring 81 again presses the index bolt 71 into the recess 85 whereby the movable cutter plate 25 is fixed. Spring 81 also presses the pivot 71 outwardly into its starting position. This outward movement of the pivot 71 is effected already at a time prior to the final disengagement of the carriage from the movable cutter plate.

According to a further development of the design according to FIGS. 9 and 10, a device is provided for withdrawing from the disc, and for inserting into the disc, the movable cutter plate 25 which comprises a pivot 71 with head 72. As described above, when pivot 71 is moved radially inwardly, plate 25 is unlocked from plate 21. Laterally of the bore 74, in the movable cutter plate 25, there is provided one parallel bore 90 each into which the pivots 91 of a supporting and release plate 92 are so detachably insertable that the plate will be able to occupy the position shown in FIGS. 9 and 10. Plate 22 has at its intermediate section a bushing 93 with a bore 94 which is parallel to the pivot 91. Bore 94 receives the axle 95 of an eccentric protruding from bore 94, this eccentric extending beyond the head 72 of the pivot 71. That axle end 97 which protrudes from the bore 94 is provided with a head 98 which carries a handle 98a and can be rotated from a position to release pivot 71 into position to hold pivot 71 in a radially inner position.

At that side of flange 93a which faces away from the pivot 91, the flange 93a of bushing 93 has a threaded bore 99 with a screw 99a the head 100 of which is adapted to be received in a recess 101 of the axle 95 when the eccentric 96 is rotated into pin depressing position. Instead of a screw, also a spring element may be employed.

Figure 7:
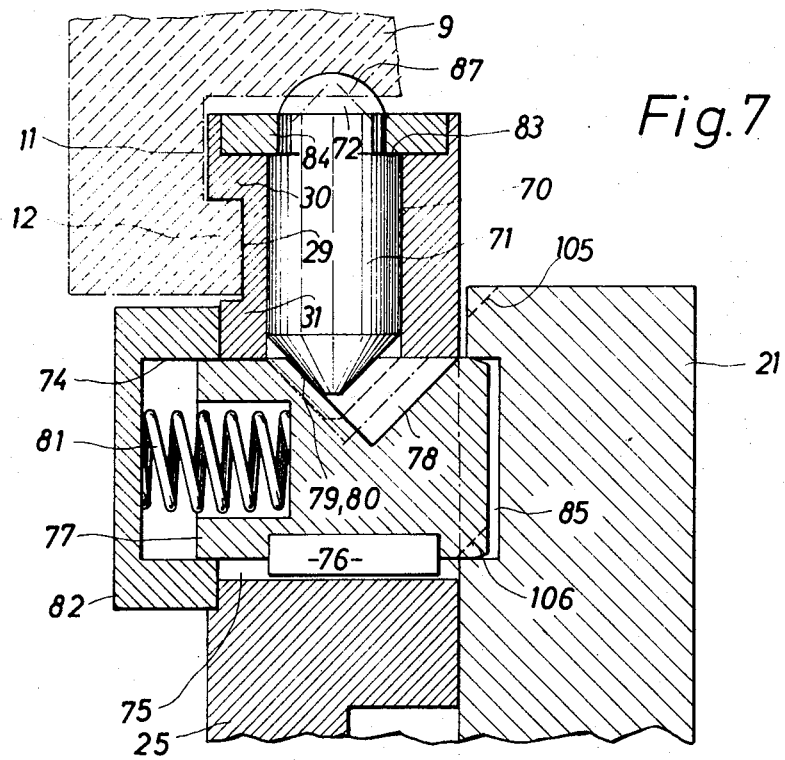
FIG. 7 illustrates a portion of the movable and of the stationary cutting blade and also shows the index bolt, the pivot and the lower margin of the cutter carriage according to a modification of the invention.
Figure 8:
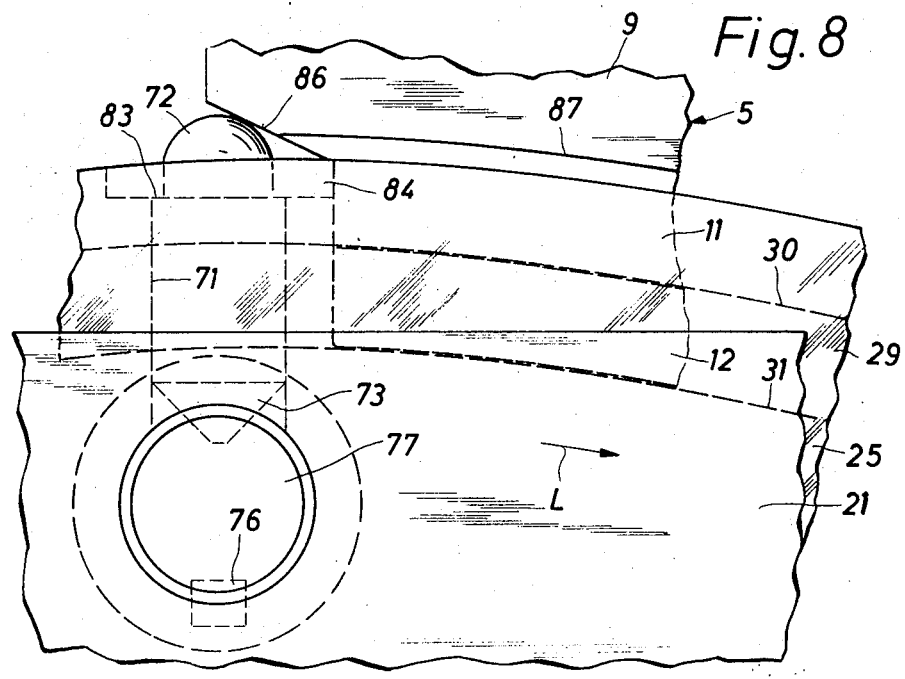
FIG. 8 is a top view of the parts shown in FIG. 7, while the cutter carriage is shown in its position at which it moves against the head of the pivot.

The outside of plate 92 carries the legs 102 of a U-shaped yoke by means of which the movable cutter plate 25 on plate 92 is adapted to be pulled out of its guiding means in the direction of the arrow F when the eccentric 96 has been turned 180° from the FIGS. 9 and 10 position thereof. For purposes of introducing the movable cutter plate 25 into the revolving disc, the eccentric is held in its effective position either by the screw 99 or the spring element. As illustrated in FIG. 7, the outer rim of the stationary cutter plate 21 may have an inclined surface 105 while the bolt has an inclined surface 106 by means of which the index bolt is adjusted relative to spring 81. This arrangement permits a plate 25 to be inserted into the disc without the use of the withdrawing tool above described.

It is, of course, to be understood that the present invention is, by no means, limited to the particular showing in the drawings but also comprises any modifications within the scope of the appended claims.

What is claimed is:

1. In a tool device; a frame, an indexable disc rotatable in said frame and having circumferentially spaced tool plate receiving stations, a first stationary tool plate in each said station and a second moveable tool plate in each said station, each moveable tool plate being moveable from a radially outer rest position on said disc radially inwardly of the disc for a cutting operation, a cutter carriage in said frame moveable radially of said disc and operable during movement toward said disc to engage a said second tool plate which is radially aligned therewith in a respective indexed position of said disc and to actuate the respective second tool plate radially inwardly of said disc, and abutment means on said disc for engaging and holding each said second tool plate on said disc in at least the said radially outer positions of said second tool plates.

2. A tool device according to claim 1 which includes means resiliently urging each said second tool plate radially outwardly of said disc.

3. A tool device according to claim 1 in which each said second plate includes lateral projections, said abutment means being engageable with the radially outer sides of said projections.

4. A tool device according to claim 1 in which said abutment means are adjustable in the radial direction of said disc.

5. A tool device according to claim 1 in which each station is in the form of a recess extending radially into said disc, a pair of rods in each recess at the sides of said second plate, projections on each said second plate slidable on said rods in the respective station, springs surrounding said rods and engaging the radially inner sides of said projections, said abutment means comprising nuts on said rods engaging the radially outer sides of said projections.

6. A tool device according to claim 1 in which each station is in the form of a recess extending radially into said disc and in which said plates are mounted, at least said second plates being exposed on one axial side of said disc, annular groove means extending about said one axial side of said disc and across the exposed faces of said second plates, and a rib on said carriage engaging said groove.

7. A tool device according to claim 6 in which said groove means is disposed in a radially outer portions of said disc and said second plates, said rib on said carriage being curved and disposed within the circumferential limits of the said second plate radially aligned therewith.

8. A tool device according to claim 1 in which said abutment means comprises an axial bolt in one of said plates and an axial recess on the other to receive the end of the bolt and lock the plates together, means urging said bolt toward locking position, a radial actuating element in said one plate engaging said bolt and moveable radially inwardly thereof to retract said bolt from locking position, and cooperating elements of cam and follower means on said carriage and each said actuating element operable upon indexing movement of said disc to move the actuating element pertaining to the station radially aligned with said carriage radially inwardly into bolt retracting position.

9. A tool device according to claim 8 in which said bolt and actuating element are in said second plate and said recess is formed in said first plate.

10. A tool device according to claim 8 in which said bolt is nonrotatable in said one plate, said bolt and actuating element having opposed engaging inclined surfaces.

11. A tool device according to claim 8 in which each said actuating element protrudes radially outwardly from the respective said one plate and has a rounded outer end, said carriage having an inclined cam region to engage said rounded outer ends when the respective station is moved into radial alignment therewith.

12. A tool device according to claim 8 in which a compression spring acts on the end of said bolt and urges the bolt toward locking position.

13. A tool device according to claim 9 in which said second plate includes means for connection thereto of a withdrawing device, said device comprising means for radially actuating said pin to unlock said second plate from said first plate.

* * * * *